(12) United States Patent
Solomon

(10) Patent No.: US 6,339,893 B1
(45) Date of Patent: *Jan. 22, 2002

(54) WATERFOWL DECOY WITH SEPARATELY MOVABLE WINGS AND FEET

(76) Inventor: Walter Solomon, 505 N. Price, Marshall, TX (US) 75670

( * ) Notice: Subject to any disclaimer, the term of this patent is extended or adjusted under 35 U.S.C. 154(b) by 0 days.

This patent is subject to a terminal disclaimer.

(21) Appl. No.: 09/158,950

(22) Filed: Sep. 21, 1998

Related U.S. Application Data

(63) Continuation-in-part of application No. 08/675,960, filed on Jul. 5, 1996, now Pat. No. 5,809,683.

(51) Int. Cl.[7] .............................................. A01M 31/06
(52) U.S. Cl. ................................................................ 43/3
(58) Field of Search ............................................ 43/2, 3

(56) References Cited

U.S. PATENT DOCUMENTS

| | | | | |
|---|---|---|---|---|
| 2,443,040 A | * | 6/1948 | Jones | 43/3 |
| 2,480,390 A | * | 8/1949 | Thompson | 43/3 |
| 2,704,416 A | * | 3/1955 | Laird | 43/3 |
| 2,747,314 A | * | 5/1956 | McGregor | 43/3 |
| 2,799,960 A | * | 7/1957 | Riley | 43/3 |
| 2,814,146 A | * | 11/1957 | Propp | 43/3 |
| 2,835,064 A | * | 5/1958 | Webb | 43/3 |
| 3,000,128 A | * | 9/1961 | McAda | 43/3 |
| 3,074,195 A | * | 1/1963 | Vanderpool | 43/3 |
| 4,896,448 A | * | 1/1990 | Jackson | 43/3 |
| 5,960,577 A | * | 10/1999 | Walterson | 43/3 |

* cited by examiner

*Primary Examiner*—Kurt Rowan
(74) *Attorney, Agent, or Firm*—The Law Offices of D. Scott Hemingway

(57) ABSTRACT

Apparatus for adding movable wings and feet to a conventional hollow waterfowl decoy includes a battery powered electric motor with a rotary disk operatively connected thereto, disposed in the hollow interior of the decoy body, a pair of wing assemblies extending through a pair of opposed slots in the sides of the decoy body and connected to the rotary disk and a pair of foot assemblies extending through a second pair of opposed slots in the sides of the decoy body and connected to the rotary disk, such that activation of the motor and resulting rotation of the disk produces oscillatory motion of the wing assemblies and foot assemblies to simulate the movement of live birds. A method of adding movable appendages to a waterfowl decoy and a method of adjusting the movement of such appendages are also provided.

20 Claims, 10 Drawing Sheets

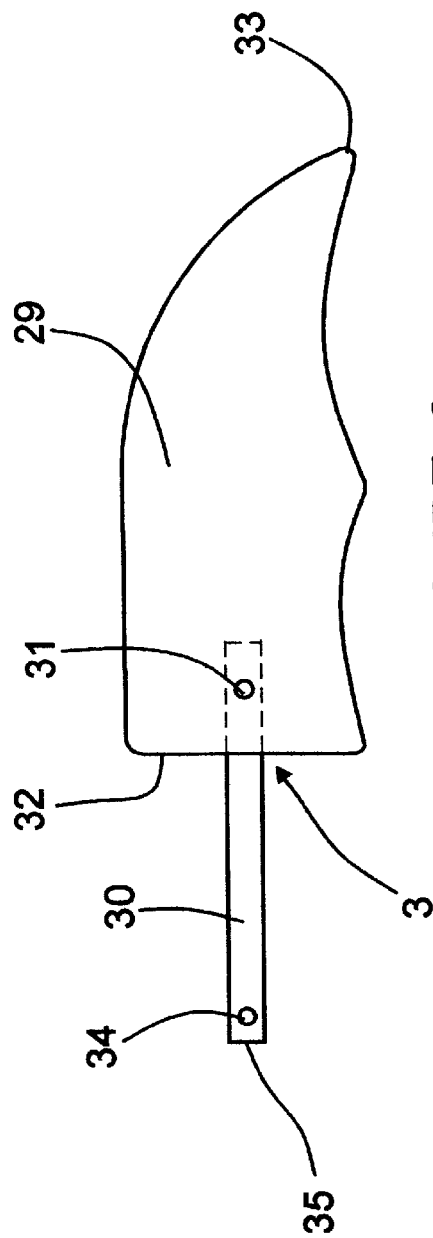
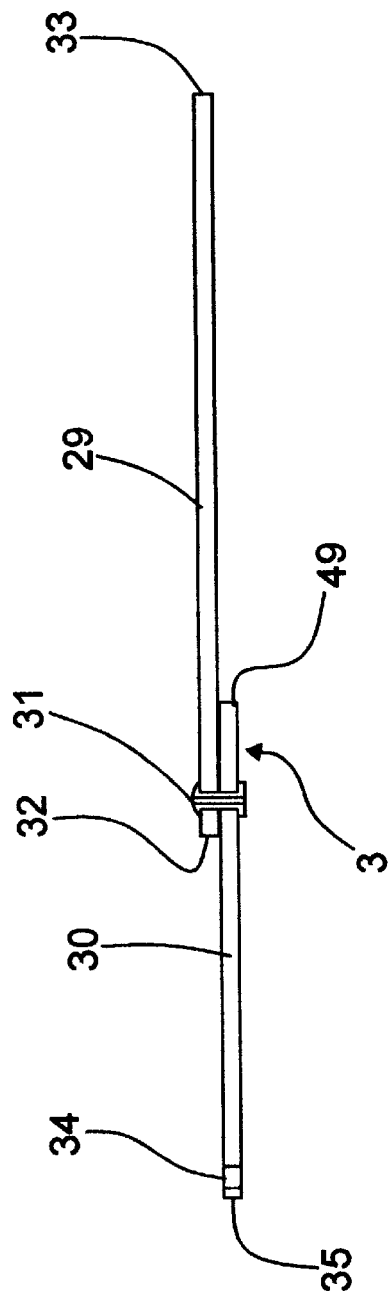

WATERFOWL DECOY WITH SEPARATELY MOVABLE WINGS AND FEET

RELATED APPLICATION DATA

This application is a continuation in part of U.S. Utility patent application Ser. No. 08/675,960, titled "Battery Powered Apparatus To Provide Movable Wings And Feet On Waterfowl Decoys, Including Method Of Assembly", and filed on Jul. 5, 1996 now U.S. Pat. No. 5,809,683.

FIELD OF THE INVENTION

The present invention generally relates to waterfowl decoy devices, and in its preferred embodiments more specifically relates to waterfowl decoy devices with movable wings and feet.

BACKGROUND OF THE INVENTION

Waterfowl decoys have long been used by hunters in an effort to attract ducks and other waterfowl to a particular body of water or to a particular location in a body of water. Traditionally, such decoys have been made as inanimate structures that are placed on a body of water and allowed to float passively thereon, without movement of any kind. In the past, passive stationary decoys have been reasonably effective in attracting waterfowl to land in proximity to the decoy or decoys. However, waterfowl adapt to changes in their environment, and in response to increased hunting pressure many waterfowl have become more cautious in their behavior and are less likely to be attracted by stationary decoys. It appears that many waterfowl have learned to distinguish the difference between live birds and stationary decoys. The primary difference between live birds and traditional decoys is motion. Live waterfowl are constantly moving their bodies, flapping their wings and paddling their feet.

Attempts have been made in the past to overcome the problems associated with stationary decoys, and decoys that exhibit various forms of motion are known in the prior art. For example, U.S. Pat. No. 2,799,960 to Riley discloses a decoy with a motor driven propeller and movable head. Other examples of propeller driven decoys include U.S. Pat. No. 2,814,146 to Propp; U.S. Pat. No. 2,835,064 to Webb; U.S. Pat. No. 3,074,195 to Vanderpool; and U.S. Pat. No. 3,000,128 to McAda. U.S. Pat. No. 2.443,040 to Jones and U.S. Pat. No. 2,704,416 to Laird disclose decoys with fully submerged paddle mechanisms to impart movement to a decoy. Other examples include U.S. Pat. No. 2,747,314 to McGregor, which discloses a decoy apparatus with movable wings and head; U.S. Pat. No. 2,480,390, which discloses a decoy with movable wings; U.S. Pat. No. 4,896,448, which discloses a decoy with movable wings; and British Patent No. 383,031, which discloses a bird decoy with movable wings.

The efforts known in the prior art have been effective in producing one or more forms of motion, but have been much less effective in producing lifelike motion and imparting a realistic appearance to decoys. Accordingly, they have been only marginally successful in providing the desired effect of attracting waterfowl. Many of the apparatus designs known in the prior art are complex in structure, adding to the cost of production and to the difficulty of use. There remains a need for a decoy apparatus that produces wing movement and foot movement in a lifelike manner so as to realistically simulate the appearance of live waterfowl and the manner of movement of waterfowl in the water.

SUMMARY OF THE INVENTION

The present invention provides a waterfowl decoy that addresses and overcomes the deficiencies and problems of the prior art by producing wing movement that effectively simulates the movement of live waterfowl and by producing foot movement that propels the decoy in the water with lifelike motion and appearance. The wing and foot movement exhibited by the decoy of the present invention is produced by a drive apparatus that is simple in structure and operation, inexpensive to produce, and easy to install in a hollow decoy body of conventional design.

The present invention utilizes a conventional floating decoy body, generally comprising a body with a hollow interior, a top, two opposing sides, a head end, and a tail end. An opening is formed in the top of the decoy body to provide access to the hollow interior for installation of the drive assembly, for installation and adjustment of wing assemblies and foot assemblies, and for operation of the drive assembly. The decoy body is also provided with a pair of wing slots formed in the opposing sides of the body through which a portion of each of two wing assemblies is inserted, and a pair of foot slots in the opposing sides of the body near the tail of the decoy body through which a portion of each of two foot assemblies is inserted.

The drive assembly of the present invention includes a drive means, preferably a battery powered electric motor, which drives a rotary disk to which a pair of wing assemblies and a pair of foot assemblies are attached. The motor includes an output shaft, and is oriented in the hollow interior of the body with the output shaft extending toward the top of the body, generally perpendicular to the planes defined by the wing slots and the foot slots. The rotary disk is connected to the output shaft so that it rotates in a plane generally parallel to the planes defined by the wing slots and foot slots. The rotary disk includes a plurality of apertures spaced between the center of the disk and its periphery. As the rotary disk turns, the wing assemblies and foot assemblies move in an oscillatory pattern to create the desired water splashing, wing movement and paddling actions. The characteristics of the wing movement and foot movement may be adjusted by changing the point of attachment of the wing and foot assemblies to the rotary disk.

The wing assemblies each include an elongate wing support and a wing, with the wing attached at one end of the wing support. The opposite end of the wing support is adapted to be attached to the rotary disk of the drive means, with the wing support extending through one of the wing slots formed in the body of the decoy. Similarly, the foot assemblies each include an elongate foot support, preferably of L-shaped configuration, and a foot. The foot is attached to the short leg of the L-shaped foot support. The long legs of the foot supports extends through the foot slots in the body of the decoy and are attached at their ends to the rotary disk of the drive means along with the wing supports.

When the assembled decoy is placed in a body of water the body of the decoy will float on the water with the wing assemblies disposed generally parallel to and above the surface and with the foot assemblies extending over and partially into the water, so that the feet are at least partially submerged in the water. When the drive means is activated the output shaft and attached disk rotate, causing the wing assemblies and foot assemblies to move in an oscillatory motion. The wing assemblies move over the surface of the water in a lifelike manner. Simultaneously, the feet move, creating ripples and splashes in the water and moving the decoy in the water. The range of movement of the wing and foot assemblies may be adjusted by changing the point of connection of those assemblies to the rotary disk of the drive means. Connecting the wing and foot assemblies at a point near the center of the disk results in the lowest range of movement, and the range of movement increases as the point of connection is moved toward the periphery of the disk. The preferred drive means of a battery operated electric motor will typically operate for several days before battery replacement is required, and replacement is a very simple operation. The unique combination of wing and foot movement provided by the decoy of the invention effectively simulates the movement of live birds and produces ripple and wake patterns in the water that are similar to those created by the movement of live birds.

If desired, the decoy of the invention may be set up and operated so as to generate only wing movement, by installing only the wing assemblies, or to generate only foot movement, by installing only the foot assemblies. Wing only and/or foot only operation may be desirable to vary the types of decoy movement displayed to live birds when several decoys are deployed in a group on a body of water.

BRIEF DESCRIPTION OF THE DRAWINGS

FIG. 6 is a top view of the preferred embodiment of a wing assembly.

FIG. 7 is a front view of the preferred embodiment of the wing assembly shown in FIG. 6.

DETAILED DESCRIPTION OF THE PREFERRED EMBODIMENT

Figure 1:
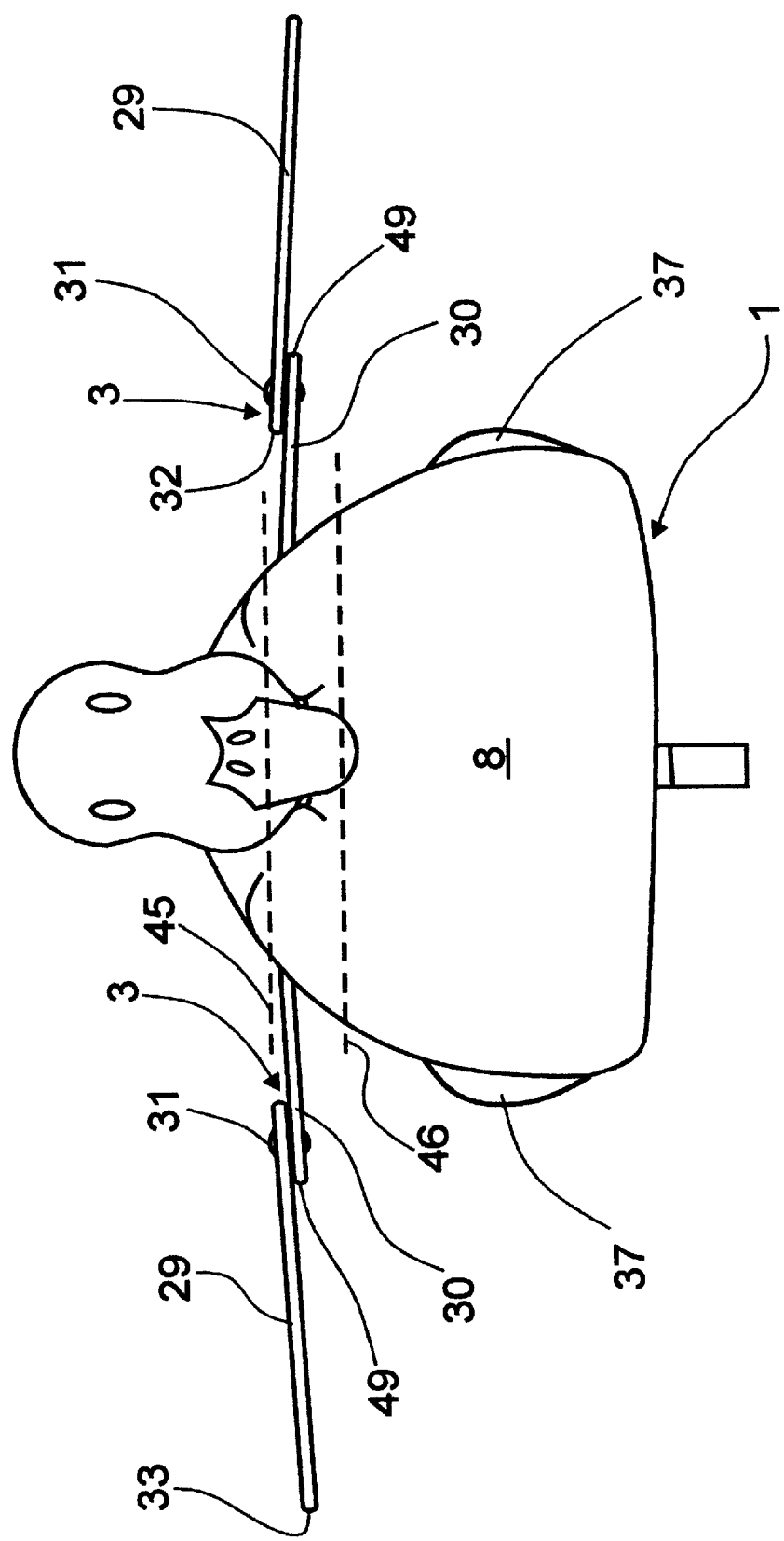
FIG. 1 is a front view of a decoy prepared for use in accordance with the preferred embodiment of the invention.
Figure 2:
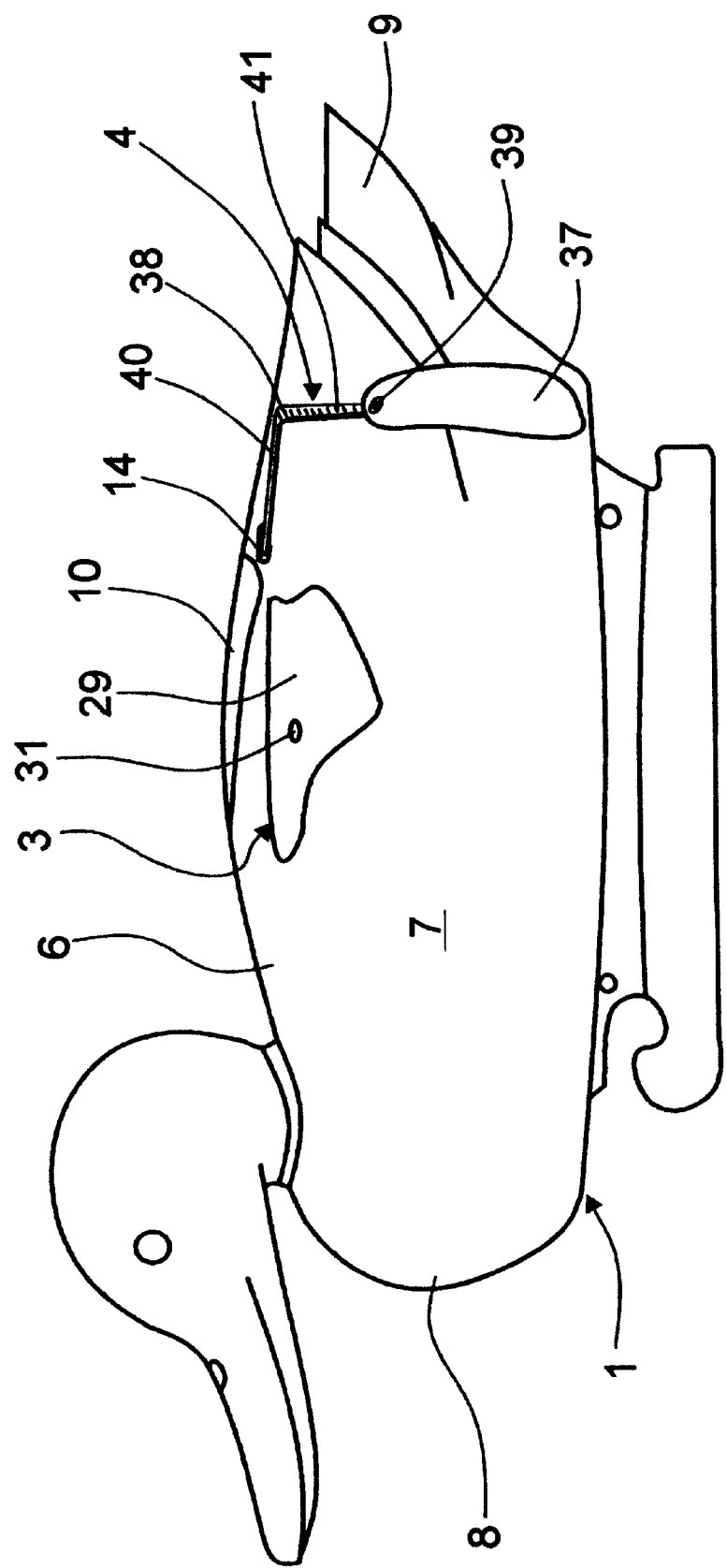
FIG. 2 is a side view of a decoy of the preferred embodiment of the invention as shown in FIG. 1.
Figure 3:
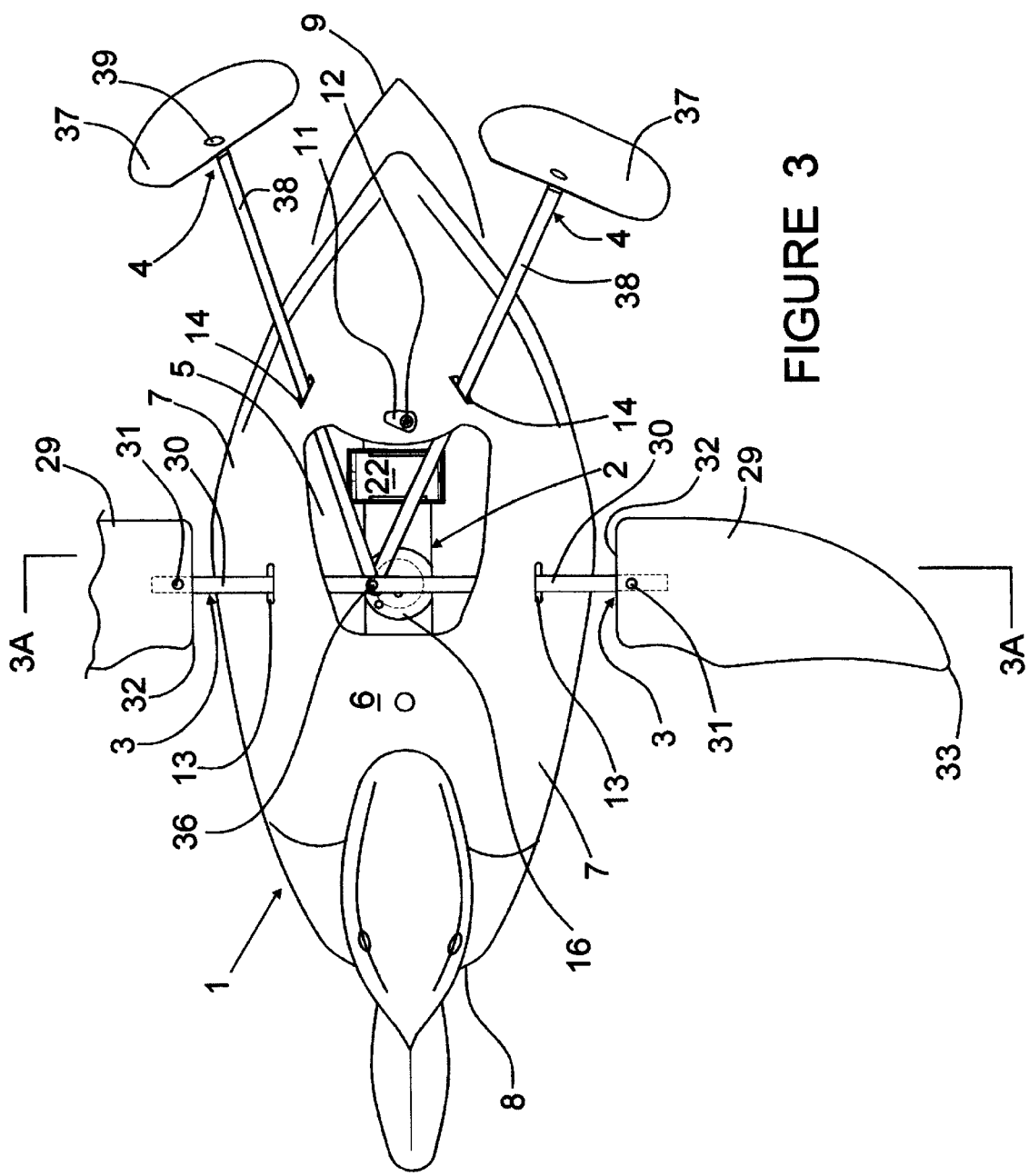
FIG. 3 is a top view of the drive assembly, wing assemblies, and foot assemblies of the preferred embodiment of the invention, installed in a decoy body, with the lid flap removed to show the installation.
Figure 3A:
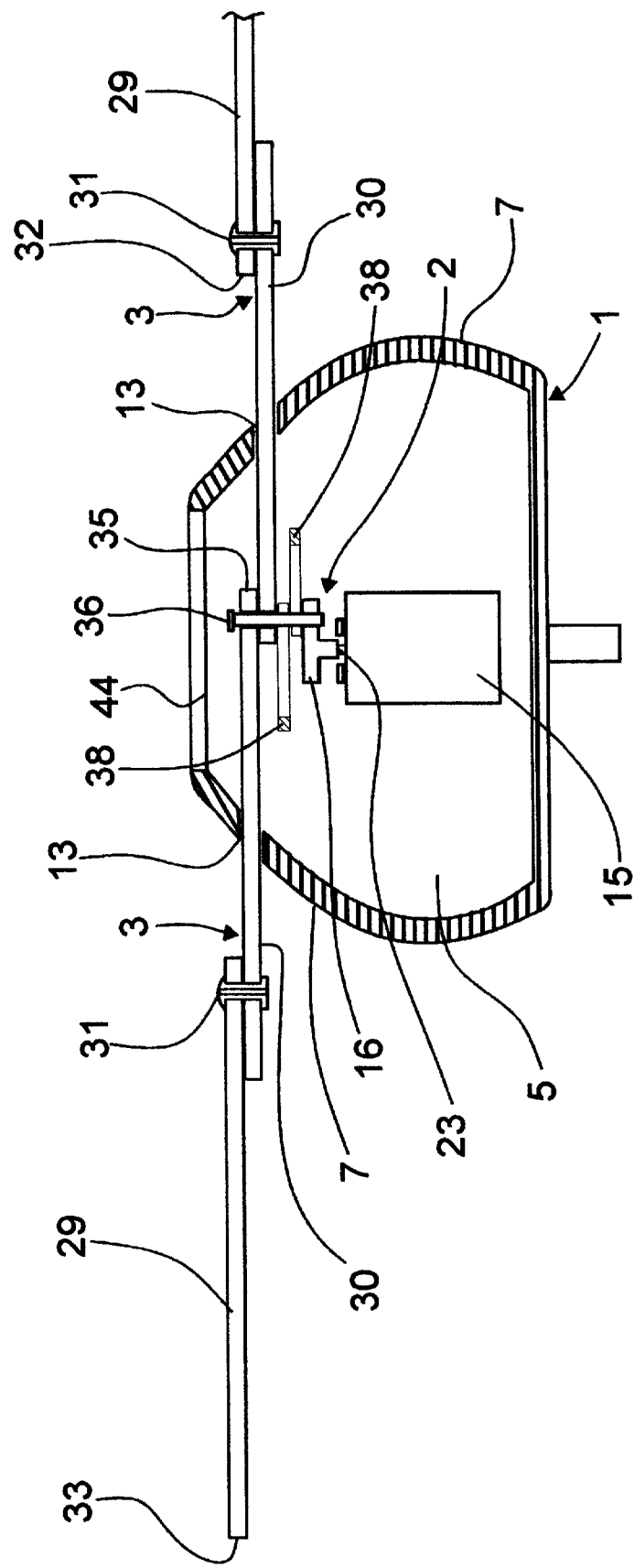
FIG. 3A is a cross-sectional view of the preferred embodiment of the decoy of the invention, along line 3A of FIG. 3.
Figure 4:
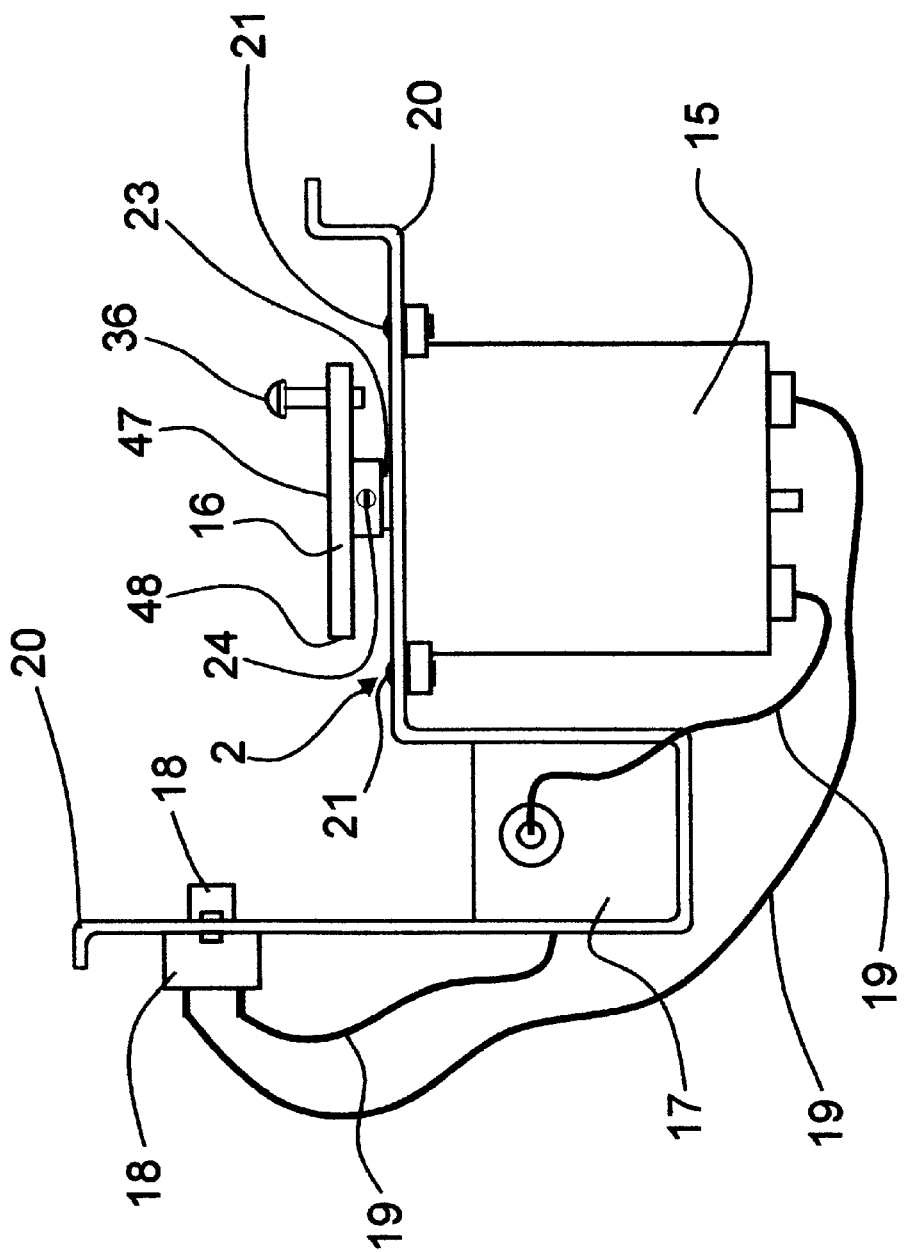
FIG. 4 is a side view of the preferred embodiment of the drive assembly of the invention, prior to installation into the body of a decoy.
Figure 5:
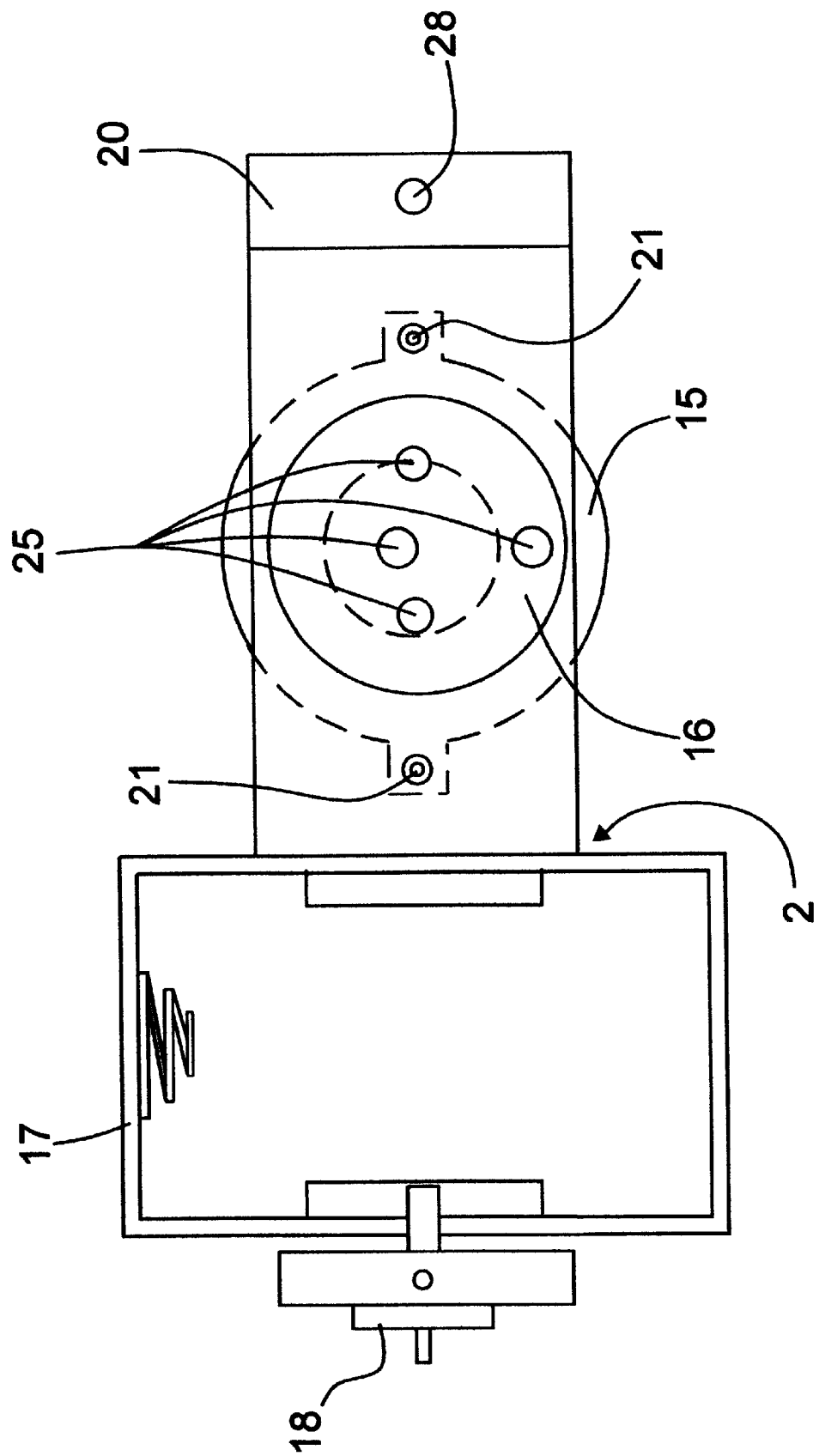
FIG. 5 is a top view of the FIG. 4 configuration.
Figure 9:
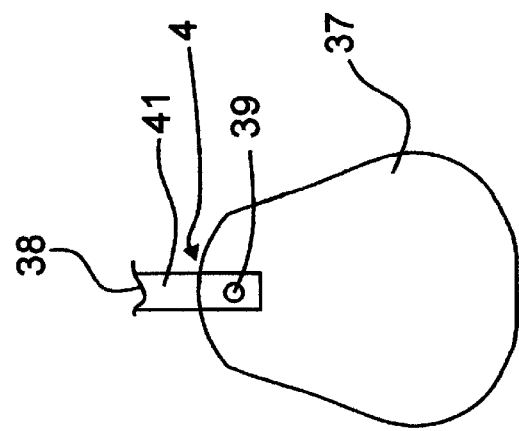
FIG. 9 is an end view of the preferred embodiment of the foot assembly shown in FIG. 8.
Figure 8:
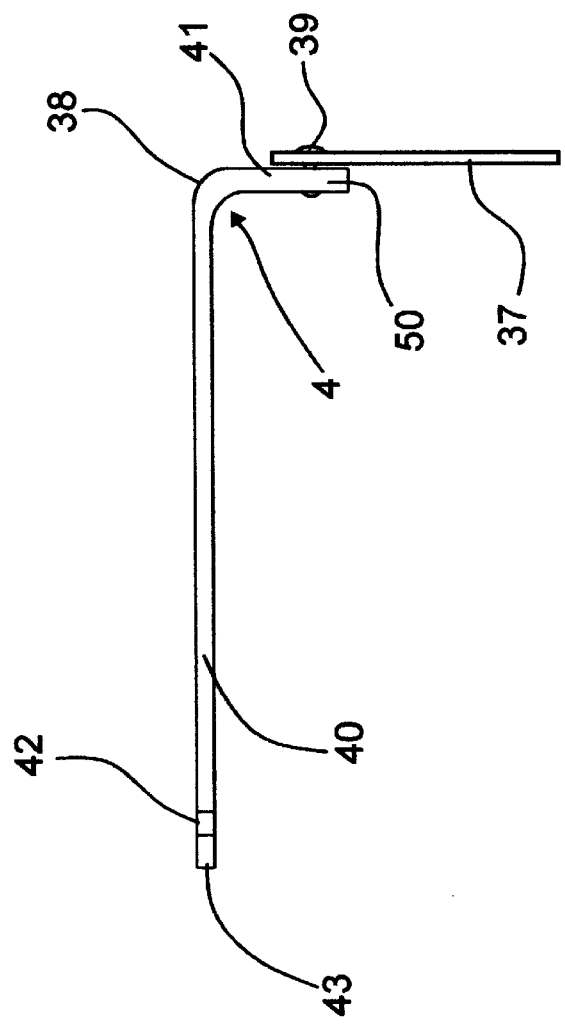
FIG. 8 is a side view of the preferred embodiment of a foot assembly.
Figure 10:
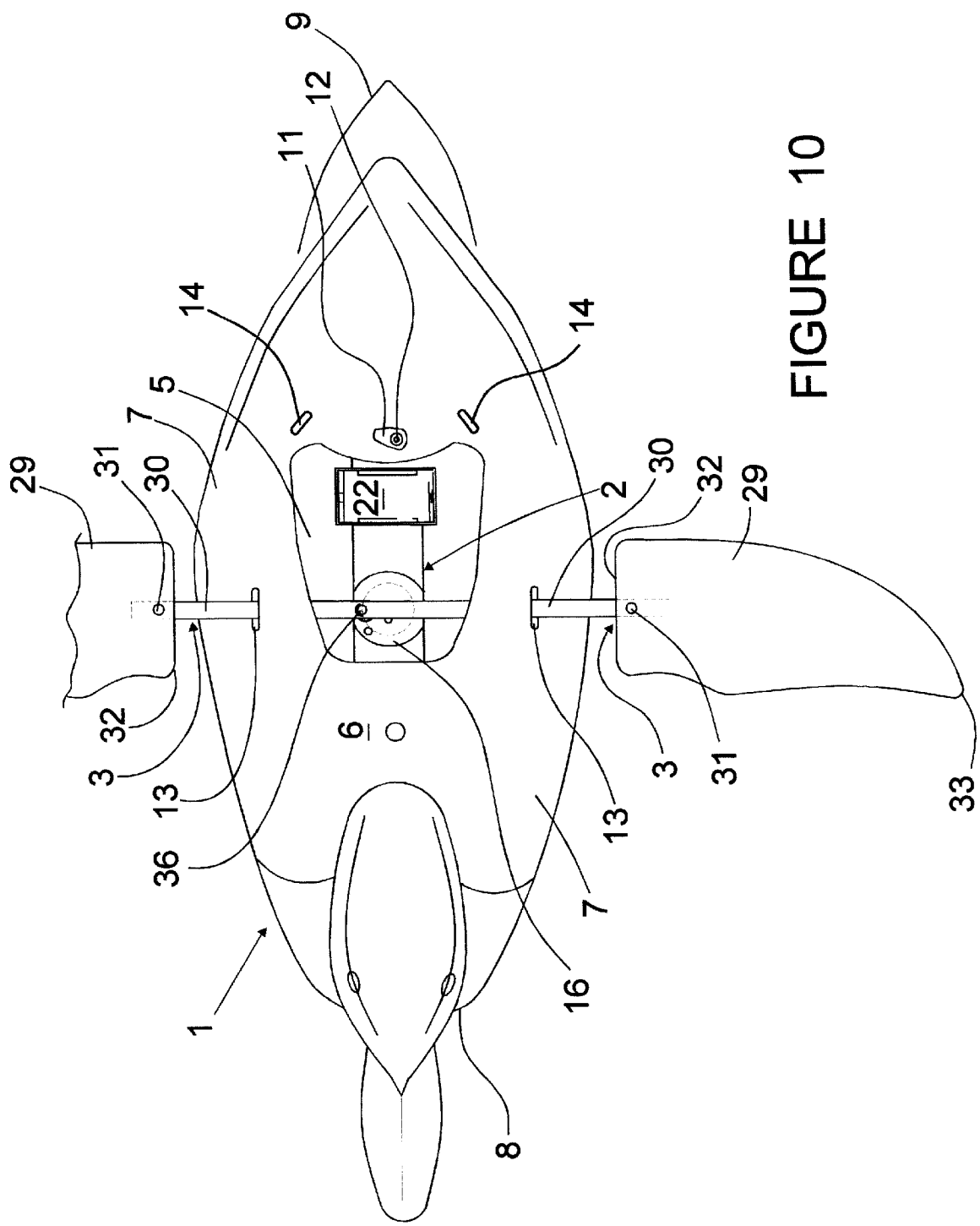
FIG. 10 is a top view of a first alternative configuration of the decoy of the invention.
Figure 11:
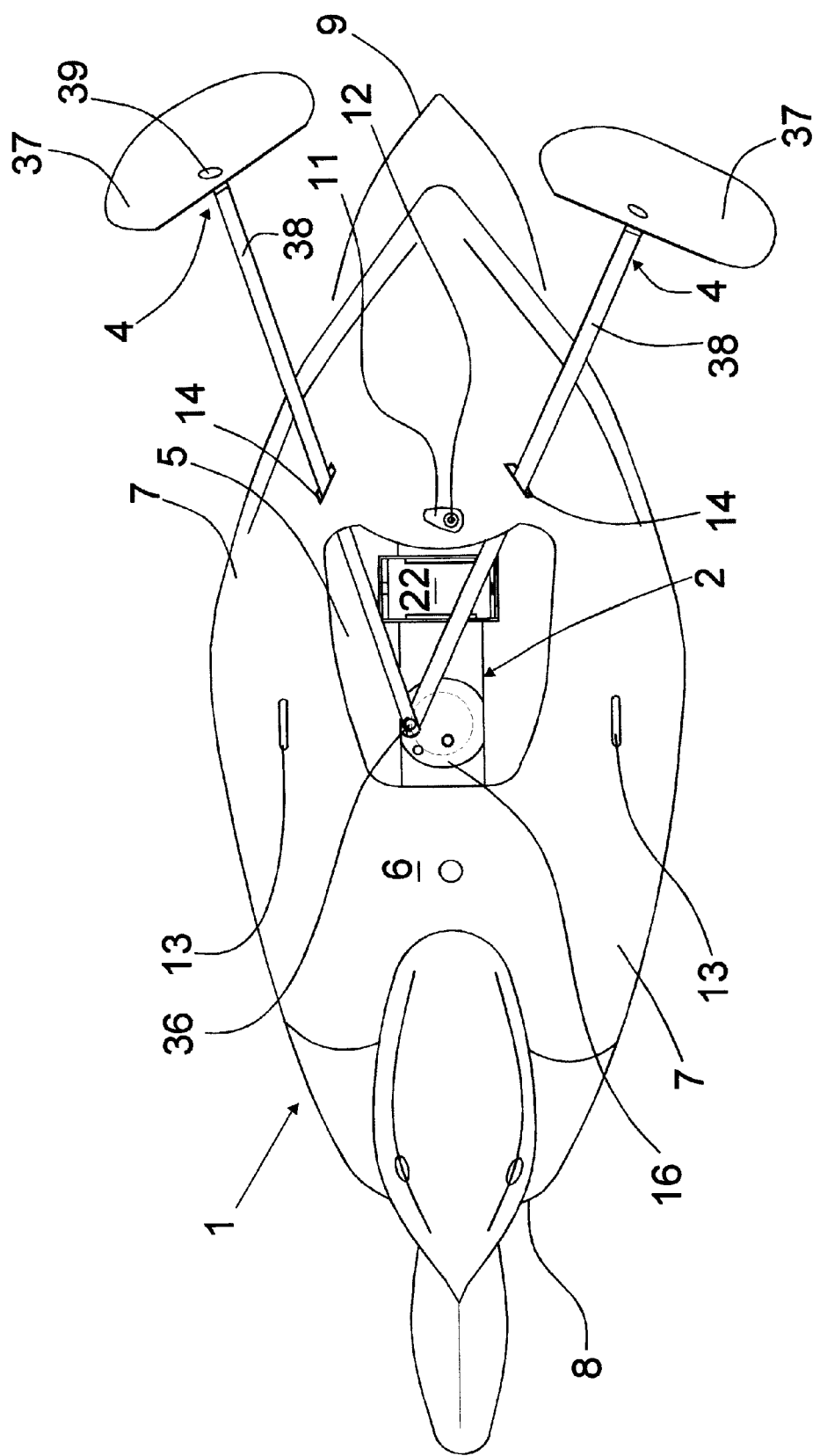
FIG. 11 is a top view of a second alternative configuration of the decoy of the invention.

Referring to the drawing figures, the preferred embodiment of the decoy of the invention will be seen to generally include a hollow decoy body 1, a drive assembly 2, a pair of wing assemblies 3, and a pair of foot assemblies 4.

The apparatus of the invention is designed for use with a conventional commercial waterfowl decoy constructed with body 1 surrounding a hollow interior 5. Body 1 includes a top 6, opposing sides 7, a head end 8, and a tail end 9. The body of the decoy is formed, or a commercially obtained decoy is prepared by forming a flap 10 in the top 6 to provide an opening 44 for insertion of the drive assembly. Flap 10 may be lifted to expose an opening into the interior 5 of body 1, and then pushed back into place to close the opening. Flap 10 is secured in place in a closed position by latch 11, preferably a semi-rigid plastic strip secured to the top of the body with fastener 12. Fastener 12 may be a rivet, eyelet, brad, or other convenient fastening device that allows latch 11 to rotate around the fastener so that the latch can be moved to selectively release or secure flap 10. A wing slot 13 is provided in each side 7 of the body 1 near the midpoint of the body, to receive the wing support component of a wing assembly. Wing slots 13 may be formed as rectangular slots, as circular holes, or in any other convenient configuration that allows sufficient clearance to accommodate movement of the wing supports. A foot slot 14 is provided in each side 7 of body 1 near the tail end of the body, to receive the foot support component of a foot assembly. The pair of wing slots 13 define an imaginary plane 45 and the pair of foot slots 14 define an imaginary plane 46, as indicated by dashed lines in FIG. 1.

In the preferred embodiment of the invention, drive assembly 2 generally includes an battery powered electric motor 15, rotary disk 16, a battery holder 17 with on-off switch 182 and associated wiring 19, and a mounting bracket 20. Motor 15 preferably comprises a commercial 1.5 volt low speed electric motor with a no-load speed of approximately 115 rpm, which results in an operating speed under load of approximately 80 rpm. However, it should be understood that alternative drive means may be utilized instead of electric motor 15, such as other types of electric motors or even mechanically driven motors, within the scope of the invention. Motor 15 is secured to bracket 20 by fasteners 21. A conventional commercially available battery holder 17 and conventional on-off slide switch 18 are also secured to bracket 20 by fasteners 21. Battery holder 17 includes positive and negative contacts connected to switch 18 and motor 15 by wiring 19. Battery holder 17 is preferably sized for one 1.5 volt D-cell battery 22. Again, it should be understood that other types of battery holders, switches, and configurations may be utilized, if desired, within the scope of the invention. Bracket 20 is preferably made from corrosion-resistant aluminum and is shaped to contain the primary components of the drive assembly and facilitate installation of the drive assembly in the body of the decoy.

Motor 15 includes an output shaft 23 which is caused to rotate when the motor is activated by the application of electrical energy thereto. Disk 16 is secured to output shaft 23 by set-screw 24 or other convenient fastening means, so that disk 16 is disposed in a plane perpendicular to the axis of shaft 23 with the central axis of the disk aligned with the axis of the shaft. Disk 16 is penetrated by a plurality of apertures 25, located at various distances the center of rotary disk, 16 and the outer edge 48 of the disk, to receive pivot screw 26 for the purpose of connecting the wing assemblies and foot assemblies to disk 16.

The drive assembly of the invention is inserted into the hollow interior of the body through lid flap 10 and held in position while fastener 27 is used to secure the mounting bracket 20 through bracket holes 28. Fastener 12, which may be a rivet, eyelet, brad, or other convenient fastening device, is used as a common fastener for both latch 11 and the tail end of bracket 20. Motor 15 is positioned in the interior of the body of the decoy such that disk 16 is generally parallel to the plane defined by slots 13 and 14.

The drive assembly of the decoy operates movable appendages, preferably comprising a combination of wing assemblies and foot assemblies. Each wing assembly 3 comprises a wing 29 attached to a wing support 30 with fasteners 31 Wing 29 is formed as a generally planar body with an inner edge 32 and an outer tip 33 Wing 29 is preferably formed from a semi-flexible plastic sheet so that it will retain its shape but flex under movement. Wing support 30 comprises an elongate strip with an outer end 49, and is preferably formed a more rigid plastic material. Each wing 29 is connected to a wing support 30 with the majority of the length of the wing support extending outwardly from inner edge 32 of the wing. Connection between wings 29 and wing support 30 may be made with any convenient conventional fasteners such as rivets, brads, or eyelets. Hook and loop fasteners, such as marketed under the Velcro trademark, may also be used. A pivot hole 34 is provided at the inner end 35 of each wing support 30. Pivot hole 34 is sized for a loose fit with pivot screw 36 when mounted on rotary disk 16. The wing assemblies are configured as mirror images of each other.

Each foot assembly 4 includes a foot 37 attached to a foot support 38 with fasteners 39. Foot 37 is formed as a generally planar body with an outer end 50. Foot 37 is preferably formed from a semi-flexible plastic sheet so that it will retain its shape but flex when moved through water. Foot support 38 is preferably made from a more rigid plastic material and is formed as an elongate "L-shaped" member with a long leg 40 and a short leg 41. Each foot 37 is connected to short leg 41 of the foot support, so that it will contact and extend into the water when the decoy is afloat. The connection between feet 37 and foot supports 38 may be made with any convenient conventional fasteners, such as rivets, brads, or eyelets. Hook and loop fasteners, such as those marketed under the Velcro trademark, may also be used. A pivot hole 42 is provided at the inner end 43 of each foot support 4. Pivot hole 42 is sized for a loose fit with pivot screw 36 when mounted on rotary disk 16. The foot assemblies are configured as mirror images of each other.

It is anticipated that the decoy of the invention will be delivered to the user without battery 22 and with the two wing assemblies and the two foot assemblies disconnected from the drive assembly, to save space and minimize the possibility of damage to the wing assemblies and foot assemblies. Those assemblies may be enclosed within the hollow interior of the body of the decoy. To prepare the decoy for use, a wing support 30 is inserted through each wing slot 13 in each side of the body of the decoy, a foot support 38 is inserted through each foot slot 14 and the pivot holes in the wing supports and the foot supports are mutually aligned with an aperture 25 in disk 16. The inner ends of the wing supports and of the foot supports are then loosely secured to rotary disk 16 by extending pivot screw 36 through pivot holes 34 and 42 and into the selected aperture 25 in disk 16. An appropriate battery 22 is inserted into battery holder 17 and switch 18 is placed in the "on" position, activating motor 15, and flap 10 is closed and secured with latch 11. The operating decoy may then be placed on the surface of a body of water to attract waterfowl by the movement and splashing of the wings and feet. The wing supports and the foot supports should be secured to disk 16 with a single pivot screw to avoid interference between the wing supports and the foot supports as disk 16 rotates. The wing supports and foot supports could be secured to disk 16 in different locations, if appropriate means are employed to avoid interference during rotation of the disk, but such an arrangement would not enhance performance and would compromise reliability and is accordingly not preferred. It is also possible to prepare the decoy for use in a manner that generates movement of only one set of appendages, i.e. only wing movement or only foot movement, at the discretion of the user. To provide only wing movement, the foot assemblies are omitted and only the wing supports are attached to the rotary disk. Conversely, to provide only foot movement, the wing assemblies are omitted and only the foot supports are attached to the rotary disk. The ability to configure the decoy of the invention for three distinct modes of operation provides an unprecedented level of flexibility for a user.

When the wing supports and foot supports are extended through the respective slots in the body of the decoy and connected to the disk as described and the decoy is placed in a body of water, the planes defined by the respective pairs of slots are generally parallel to the surface of the water. The wing assemblies extend outwardly from the respective sides of the body of the decoy, with the wings generally parallel to the plane defined by the slots and to the surface of the water. The wing tips are disposed upon or slightly above the surface of the water. The foot assemblies extend outwardly from the sides and to the rear of the body of the decoy with the feet extending into the water. As disk 16 is rotated by motor 15 the ends of the wing supports and the foot supports connected to the disk are caused to move in a circular pattern around the central axis of the disk, producing an oscillatory motion of the wings and feet. The wing slots and foot slots in the sides of the body of the decoy restrain movement of the wing supports and foot supports in the direction of the longitudinal axis of the decoy and act as pivot points for the wing supports and foot supports so that the wings and feet move in regular patterns. The movement of the feet creates constant movement of the decoy in the water and produces ripples in the water that closely approximate those produced by live birds. Contact of the wing tips with the water, either continuous or intermittent, produces additional movement of the water and further enhances the effectiveness of the decoy.

The foregoing description of the preferred embodiment and certain alternative embodiments of the invention is intended to be illustrative and not limiting. The invention is susceptible to further alternative embodiments and variations in design and in use, all within the scope of the invention as disclosed and claimed.

What is claimed is:

1. Apparatus for addition of movable appendages to a waterfowl decoy adapted to float on the surface of a body of water, having a body with a top, two opposing sides, a tail, and a hollow interior, the body including an opening in the top thereof for access to the hollow interior thereof, and the body also including a plurality of slots disposed in paired opposing relationship in the sides of the body and positioned such that each pair of slots defines a plane generally parallel to the surface of the water when the decoy is floating on the surface of a body of water, the apparatus comprising a drive means having a rotatable output shaft, said drive means disposed in said hollow interior of said body and connected to said body with said output shaft disposed in generally perpendicular relation to said plane defined by each pair of said slots;

a generally planar disk having a center and an outer edge, said disk connected to said output shaft of said drive means with said disk generally perpendicular to said output shaft and generally parallel to said plane defined by each pair of said slots; and a plurality of appendage assemblies, each including an elongate support member with an inner end and an outer end, an appendage connected to said support member near said outer end thereof, said appendage assemblies disposed in paired opposing relationship with one of each pair of said appendage assemblies on a respective side of said body of said decoy with said support members extending through a respective one of said slots and mutually pivotally connected at said inner ends of each pair thereof to said disk, with said appendages disposed exterior to said body such that said support members lie generally parallel to the surface of the water when the decoy is floating on the surface of a body of water, whereby activation of said motor induces oscillatory movement of said appendage assemblies generally parallel to said plane defined by said slots.

2. The apparatus of claim 1, wherein said appendage assemblies comprise wing assemblies, wherein said support members comprise wing supports, and wherein said appendages comprise wings.

3. The apparatus of claim 1, wherein said appendage assemblies comprise foot assemblies, wherein said support members comprise foot supports, and wherein said appendages comprise feet.

4. The apparatus of claim 1, wherein said slots comprise a pair of wing slots disposed in said sides of said body near the longitudinal midpoint thereof and a pair of foot slots disposed in said sides of said body between said wing slots and said tail of said body, and wherein said appendage assemblies further comprise a pair of wing assemblies, each including an elongate wing support with an inner end and an outer end, a wing connected to said wing support near said outer end thereof, each of said wing assemblies disposed on a respective side of said body of said decoy with said wing supports extending through a respective one of said wing slots and mutually pivotally connected at said inner ends thereof to said disk at a point on said disk between said center and said outer edge thereof, with said wings disposed exterior to said body such that said wing supports lie generally parallel to the surface of the water when the decoy is floating on the surface of a body of water, whereby activation of said motor induces oscillatory movement of said wing supports generally parallel to said plane defined by said wing slots; and a pair of foot assemblies, each including an elongate foot support with an inner end and an outer end, a foot connected to said foot support near said outer end thereof, each of said foot assemblies disposed on a respective side of said body of said decoy with said foot supports extending through a respective one of said foot slots and mutually pivotally connected at said inner ends thereof to said disk at a point on said disk between said center and said outer edge thereof, with said feet disposed exterior to said body such that said foot supports lie generally parallel to the surface of the water when the decoy is floating on the surface of a body of water, whereby activation of said motor induces oscillatory movement of said foot supports generally parallel to said plane defined by said foot slots.

5. The apparatus of claim 4, wherein said wing supports and said foot supports are connected to said disk at the same point.

6. The apparatus of claim 4, wherein said wing supports are connected to said disk at a first point thereon, and wherein said foot supports are connected to said disk at a second point thereon.

7. The apparatus of claim 1, wherein said drive means comprises a battery powered electric motor.

8. The apparatus of claim 7, wherein said drive means further comprises an electric battery electrically connected to said electric motor so as to supply electrical power thereto.

9. The apparatus of claim 8, further comprising a mounting bracket disposed in the interior of said hull and connected to said hull, wherein said electric motor is connected to said mounting bracket and wherein said bracket includes a battery holder to removably receive said electric battery.

10. The apparatus of claim 8, wherein said drive means further comprises a switch means operatively connected between said electric battery and said electric motor for the purpose of selectively activating and deactivating said electric motor.

11. The apparatus of claim 1, wherein said disk includes a plurality of apertures disposed between said center of said disk and said outer edge of said disk with each of said apertures a different distance from said center, wherein each of said support members includes a pivot hole at said inner end thereof, and wherein said support members are mutually pivotally connected to said disk by a pivot pin extending through said pivot holes of said support members and through one of said apertures in said disk.

12. The apparatus of claim 4, wherein each of said foot supports is formed in an L-shaped configuration with a long leg and a short leg, with said long leg including said inner end of said foot support and with said short leg including said outer end of said foot support, wherein each of said feet of said foot assemblies is connected to said short leg of the respective one of said foot supports.

13. The apparatus of claim 4, wherein each of said wings is formed from a flexible, shape retentive material.

14. The apparatus of claim 4, wherein each of said feet is formed from a flexible shape retentive material.

15. A method of adjusting the degree of movement of the appendages of a waterfowl decoy adapted to float on the surface of a body of water, the decoy having a body with opposing sides, with a hollow interior and with a plurality of slots disposed in paired opposing relationship in the sides of the body such that each pair of slots defines a plane generally parallel to the surface of the water when the decoy is floating on the surface of a body of water, the decoy having a drive mechanism with a rotating disk having a center and a peripheral edge, said disk disposed generally parallel to the plane defined by each pair of slots, and the decoy having a plurality of appendage assemblies disposed in paired opposed relationship each having an elongate support member extending through one of the slots and being pivotally connected at one end to each other and to the rotating disk by a pivot pin extending through mating pivot holes in the support members and an aperture in the disk so that the appendage assemblies are disposed generally parallel to the planes defined by the slots and so that the appendage assemblies move in and out relative to the body of the decoy in response to rotation of the disk, comprising the steps of forming a plurality of apertures in said disk between said peripheral edge and said center of said disk with each of said apertures a different distance from said center;

pivotally connecting said support members to said disk by inserting said pivot pin through said support members and into an aperture near the peripheral edge of said disk to maximize the degree of movement of said appendage assemblies upon rotation of said disk; and pivotally connecting said support members to said disk by inserting said pivot pin through said support members and into an aperture near the center of said disk to mininize the degree of movement of said appendage assemblies upon rotation of said disk.

16. The method of claim 15, wherein said slots comprise a pair of wing slots and a pair of foot slots, and wherein said appendage assemblies comprise a pair of wing assemblies and a pair of foot assemblies.

17. A method of adding moveable appendages to a waterfowl decoy adapted to float on the surface of a body of water, the decoy having a hollow body with a top and with opposing sides, comprising the steps of forming a plurality of opposed slots in said body with said slots disposed in paired opposing relationship in the sides of the body and positioned such that each pair of said slots defines a plane generally parallel to the surface of a body of water when the decoy is floating on said body of water;

connecting a drive means in the interior of said body, said drive means including a motor with a rotatable output shaft and a generally planar disk having a center and an outer edge, said disk connected to said output shaft of said motor with said disk generally perpendicular to said output shaft and generally parallel to said plane defined by each pair of said slots; and connecting a plurality of appendage assemblies to said drive means, each including an elongate support member with an inner end and an outer end and an appendage connected to said support member near said outer end thereof, by extending each of said support members through a respective one of said slots from the exterior of said body such that said inner ends of said support members are disposed in the interior of said body and said support members extend outwardly from said body generally parallel to each plane defined by said slots, and mutually connecting said inner ends of said support members to said disk in pivotal relation thereto, such that activation of said motor so as to cause rotation of said disk will produce an oscillatory motion of said appendage assemblies generally in a plane parallel to said plane defined by each pair of said slots.

18. The method of claim 17, including the preliminary step of forming an opening in said top of said body by cutting through a portion of said top to form a flap connected to and pivotally moveable between open and closed positions with respect to said body.

19. The method of claim 18, including the additional step of connecting a latch means to said body to releasably secure said flap in said closed position.

20. The method of claim 17, wherein said slots include a pair of wing slots and a pair of foot slots, and wherein said appendage assemblies include a pair of wing assemblies disposed in paired opposed relationship relative to said body and a pair of foot assemblies disposed in paired opposed relationship relative to said body.

* * * * *